US010710185B2

(12) United States Patent
Leicht et al.

(10) Patent No.: US 10,710,185 B2
(45) Date of Patent: Jul. 14, 2020

(54) METHOD OF PREPARING A MACHINING PROCESS AND CHAMFERING STATION

(71) Applicant: GLEASON-PFAUTER MASCHINENFABRIK GMBH, Ludwigsburg (DE)

(72) Inventors: Bernhard Leicht, Niederfüllbach (DE); Eric G. Mundt, Rochester, NY (US)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 17 days.

(21) Appl. No.: 15/897,249

(22) Filed: Feb. 15, 2018

(65) Prior Publication Data

US 2019/0247941 A1 Aug. 15, 2019

(51) Int. Cl.
*B23F 23/12* (2006.01)
*B23F 19/10* (2006.01)
(Continued)

(52) U.S. Cl.
CPC ............ *B23F 19/102* (2013.01); *B23F 19/10* (2013.01); *B23F 23/12* (2013.01);
(Continued)

(58) Field of Classification Search
CPC ........ G01B 5/166; G01B 5/163; G01B 5/202; B23F 23/12; B23F 23/1218
(Continued)

(56) References Cited

U.S. PATENT DOCUMENTS 2,433,421 A * 12/1947 Bowness ................. G01B 5/00
33/545
3,172,210 A * 3/1965 Showers, Jr. ............ G01B 5/20
33/501.11
(Continued)

FOREIGN PATENT DOCUMENTS

DE 3930861 A1 3/1990
DE 4330930 A1 3/1995
(Continued)

OTHER PUBLICATIONS

Bibliographic Data for DE 102011110911 A1, EPO Espacenet, https://worldwide.espacenet.com, Feb. 14, 2018, 1 pg.
(Continued)

*Primary Examiner* — Christopher W Fulton
(74) *Attorney, Agent, or Firm* — Robert L. McDowell

(57) ABSTRACT

A method of preparing a machining process of a toothed workpiece rotatably drivable around its rotation axis, the machining process to be executed by a tool rotatably drivable around its rotation axis, wherein, for establishing a synchronized matching engagement of the tool with the workpiece toothing, a contact with the workpiece can be or is generated by performing a movement via a positioning axis, and, by means of a surveillance of a movement dedicated to an axis of motion, a contact to the workpiece is used for establishing information about a relative rotary position of the workpiece, whereby the contact is made by a portion of the tool and the dedicated axis of motion is an axis capable to move or rotate the workpiece or the tool but which is not the positioning axis.

20 Claims, 7 Drawing Sheets

(51) Int. Cl.
*G01B 5/16* (2006.01)
*G01B 5/20* (2006.01)
*G05B 19/18* (2006.01)

(52) U.S. Cl.
CPC .......... *B23F 23/1218* (2013.01); *G01B 5/163* (2013.01); *G01B 5/166* (2013.01); *G01B 5/202* (2013.01); *G05B 19/186* (2013.01)

(58) Field of Classification Search
USPC .................... 33/630, 501.11, 501.14, 501.15
See application file for complete search history.

(56) References Cited

U.S. PATENT DOCUMENTS

| | | | | |
|---|---|---|---|---|
| 3,388,477 | A * | 6/1968 | Hemmert | G01B 5/20 33/501.14 |
| 3,936,946 | A * | 2/1976 | Ruffner | G01B 7/146 33/556 |
| 4,062,125 | A * | 12/1977 | Maag | G01B 5/0002 33/501.14 |
| 4,412,765 | A | 11/1983 | Occhialini | |
| 4,498,335 | A * | 2/1985 | Thoma | G01M 13/021 33/501.9 |
| 4,519,141 | A * | 5/1985 | Meder | G01B 5/202 33/501.9 |
| 4,519,242 | A * | 5/1985 | Hofler | G01B 5/202 33/501.9 |
| 4,610,091 | A * | 9/1986 | Bertz | G01B 7/283 33/501.15 |
| 4,646,566 | A * | 3/1987 | Hofler | G01B 5/202 33/501.14 |
| 4,962,590 | A * | 10/1990 | Ambrose | G01B 5/202 33/501.14 |
| 5,052,117 | A * | 10/1991 | Kubodera | G01B 7/283 33/501.14 |
| 5,292,212 | A | 3/1994 | Taylor et al. | |
| 6,565,418 | B1 | 5/2003 | Feisel | |
| 2003/0219322 | A1 | 11/2003 | Zankl et al. | |
| 2015/0285610 | A1 * | 10/2015 | Knabel | G01B 5/20 33/501.14 |

FOREIGN PATENT DOCUMENTS

| | | | |
|---|---|---|---|
| DE | 102011110911 A1 | 2/2013 | |
| JP | 2012-148352 A | 8/2012 | |
| WO | WO-2006061145 A1 * | 6/2006 | ............ G01B 5/202 |

OTHER PUBLICATIONS

International Search Report and Written Opinion for PCT/IB2019/000109, ISA/EP, dated Jun. 12, 2019, 13 pgs.

* cited by examiner

METHOD OF PREPARING A MACHINING PROCESS AND CHAMFERING STATION

FIELD OF THE INVENTION

The invention relates to a method of preparing a machining process for a toothed workpiece, such as a gear, rotatably drivable around its rotation axis, the machining g process to be executed by a tool rotatably drivable around its rotation axis, wherein, for establishing a synchronized matching engagement of the tool with the workpiece toothing, a contact with the workpiece can be or is generated by performing a movement via a positioning axis, and, by means of a surveillance of a movement dedicated to an axis of motion, a contact to the workpiece is used for establishing information about a relative rotary position of the workpiece.

BACKGROUND OF THE INVENTION

Such a machining process of an already toothed workpiece can be for instance a chamfering operation of the tooth edges of the workpiece with a rotating cutting tool, as for instance disclosed in DE 10 2011 110 911 A1.

Before the chamfering operation may start, one has, however, to ensure that the starting condition for synchronized matching engagement of the chamfering tool with the workpiece toothing is achieved. That is, the workpiece rotary position has to be known when starting the tool engagement (while the ratio of rotation between the axes is already known from the gear and tool data).

In order to get this starting information, often centering sensors are used, for instance non-contacting sensors such as for instance described in U.S. Pat. No. 6,565,418 in the context of grinding.

The object underlying the present invention is to provide an improved preparation method, in particular with respect to reliability and simplified setup options.

SUMMARY OF THE INVENTION

This object is achieved by a further development of the method as indicated in the introductory portion above, which is essentially characterized in that the contact is made by a portion of the tool and the dedicated axis of motion is an axis capable to move or rotate the workpiece or the tool but which is not the positioning axis.

Although non-contact centering sensors are mostly used today, there may be a risk of inaccuracy in determination of the rotary position of the workpiece (that is, the position of the center of a tooth slot of the workpiece) due to an inaccuracy in the position and/or the positioning of such a sensor with respect to a fixed machine side reference as for instance a slide unit carrying the tool.

Additionally, for some contact-based gear measurements, the positioning axis is also the same axis that is under surveillance for when the contact is achieved. Alternatively, in the current invention however, the movement for achieving the contact via the positioning axis can be de-coupled from the surveillance of when the contact is established and the surveillance of when the contact is established can be accomplished via another axis. This allows for instance a more rapid motion for the positioning axis. The surveillance can be directly or indirectly, and in particular be done via observation of torques or currents arising for the dedicated axis.

In a first partial preparation step and embodiment of the present invention, the positioning axis can be a first axis moving the tool with a main direction component in the direction of the rotation axis of the workpiece, the first axis being in particular parallel to the rotation axis of the workpiece. This step serves uniquely for bringing the tool into a tooth gap/tooth slot of the workpiece in yet an unknown circumferential positioning with respect to the axis of rotation of the workpiece.

Here, it is preferred that the dedicated axis of motion is the rotation axis of the tool. Namely, should the rotary position of the workpiece be such that a tooth of the workpiece is blocking the axial displacement of the tool, the tool, when held in a torque-free tracking mode, can start to rotate in a direction against its axial motion, and said rotation can be monitored for the surveillance of the contact. Alternatively, one can provide for a surveillance of the standstill torque or current of the dedicated axis remaining in its (regular) position control mode.

In a preferred embodiment, in case of the contact generation, a positioning by means of the first axis is repeated after an execution of a rotation increment of the workpiece, until no contact is generated. This is done in order to finally bring the tool into a tooth gap of the workpiece. Of course, the rotation increment shall not be an integer multiple of the pitch of the workpiece toothing, but could be for instance 0.5 or 0.25 of the pitch or any other fraction of a pitch, which shall ensure that, at least after few repetitions, no contact is generated and the tool can enter into a tooth gap of the workpiece.

In a preferred embodiment, the tool is star-shaped and in particular of star-shaped disk form, and prior to the positioning movement a pre-positioning is effected for a radial overlap of one of the teeth of the tool with the envelope of the workpiece toothing. Said radial overlap is to be understood in a projection onto a plane orthogonal to the workpiece axis, a tooth of the tool being still axially outside the envelope of the workpiece toothing. The envelope of the workpiece toothing is defined by the envelope of the workpiece toothing generated when the workpiece is rotated, that is, corresponding to the volume of the workpiece having its tooth gaps filled up. The star-form means that there is at least one tooth, preferable at least two teeth, in particular a number between 2 and 6 teeth on the tool, with intermediate portions of lower radial extension. In particular, the tool can be a fly cutter.

In a preferred embodiment, the contacting portion of the tool for said contact generation is a portion other than the portion of the tool provided for a cutting function of the tool. Thereby, even if contact is established with higher impact velocities, no negative effecting of the cutting edges of the tool is to be observed. However, contact can be made also by the (curved) cutting edge, and also the measurement aspects discussed below, in particular for spur gears or low helix angles.

Once a tooth of the tool is inside a tooth gap of the workpiece, still without knowing the positioning of the tool tooth within the tooth gap with respect to the center of the tooth gap, the rotary position of the center of a tooth gap of the workpiece is determined in a second step.

To this end, in a preferred embodiment, as positioning axis a second axis is set, along which the tool is moved with main direction component tangential to the rotation axis of the workpiece, in particular an axis orthogonal to a plane spanned by a radial positioning axis and the rotation axis of the workpiece. By the way, the radial positioning axis of the underlying machine may be said as a machine reference with respect to a rotary position of the tooth gap center of the workpiece to be determined, the rotary position of the workpiece being provided by for instance a rotary encoder of the workpiece spindle.

It is preferred that the dedicated axis of motion in case of the second axis as positioning axis is the rotation axis of the workpiece. That is, the tangential machine axis provides the movement to generate the contact between tool and workpiece, while the rotation axis of the workpiece is the axis under surveillance to monitor the generation of contact taking place. The positioning movement can, however, also involve additional machine axes, such as a radial axis, to allow variation of the positional movement in the transverse plane (of the workpiece).

From the motion path to left-flank and right-flank with respect to a tooth gap, one can determine the tooth gap center.

One possibility to do this in a calculation free manner is in form of an iterative repetition of said contact establishment by means of the second positioning axis for left-flank and right-flank, while between two iteration steps the workpiece is rotated in a direction to shorten the longer of the path from the positioning movements along the second axis from the initial position to the left respectively right gear flank.

As said initial position, the position of the radial positioning axis can be used, that is tangentially seen the tool is centered with respect to the arrangement of the workpiece axis.

In a further or additional embodiment, it is also provided that the initial position of the tool is out-of-center with respect to the workpiece axis, such that the left-flank and the right-flank are of a respective tooth position of the workpiece not surrounding the same tooth gap in the same tooth gap rotary position. Contact is made at an outside tooth flank with respect to the radial center axis. In particular, for such an embodiment it is preferred that on the tool side the contact is made with a portion of the tool being straight or having low curvature. This allows even more accurate determinations, since due to the involute contact conditions of gear technology, the normal in the contact point is a tangent to the base circle of the involute gear such that an unknown casually existing additional material on the theoretical tooth profile of the workpiece has minor effects on the contact positioning measurements with respect to the centered position of the tool. Moreover, there are no inaccuracies due to unknown effects of the rounding of the cutting edges of the tool.

In this way, the tool is not only used for determining the tooth gap center rotary position of the workpiece toothing, but also for determining characteristics of the workpiece, in particular the tooth thickness of the workpiece toothing (after its generation process, which can be for instance hobbing, power skiving, shaping, or also other manufacturing methods such as those for bevel gears), but also other characteristics as one or more of pitch, concentricity, tooth profile and flank line configuration.

Accordingly, the invention discloses independently and protection-worthy a method of performing a machining process of a toothed workpiece rotatably drivable round its rotation axis, to be executed by a working tool rotatably drivable around its rotation axis, wherein the tool is a chamfering tool, preferably a fly cutter for chamfering the edges of the workpiece toothing and wherein a measurement on the workpiece toothing is performed by use of the chamfering tool and in the same workpiece clamping as that used for the machining process.

Preferably, a positioning contacting movement to contact the tool with the workpiece toothing is in the transverse plane of the workpiece in direction normal to the profile of the flanks (for example, an involute) of the workpiece toothing. For helical workpiece gears and a corresponding pivot of the tool axis relative to the workpiece axis it is preferred to bring the contacting tool edge (preferably straight) again in the transverse plane, by a tool rotation. Thereby, one avoids undesired misleading contact in other transverse planes than the one selected for measurement. Here, it is preferred that the axis under surveillance for the contact determination is not an axis used for the positioning to make the contact. In the effect, one uses a chamfering station also as a gear metrology machine.

Further, the invention provides a chamfering station for chamfering toothed workpieces, including a control configured to control the station to perform a (preparatory) method according to any of the previous method aspects.

Further details, features, and advantages of the invention are described below with reference to the accompanying figures.

DETAILED DESCRIPTION OF THE PREFERRED EMBODIMENTS

Figure 1B:
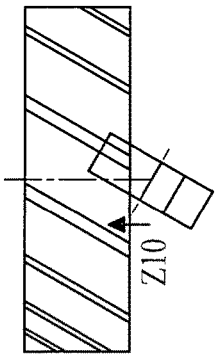
FIGS. 1A, 1B and 1C schematically show a situation where axial insertion of a tool into a workpiece is not possible.

The details of the invention will now be discussed with reference to the accompanying drawings which illustrate the invention by way of example only. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

In the following, with reference to FIG. 1, in particular FIG. 1C, a method is described in which a star-like working tool 11 is brought with one of its two teeth between two teeth 4 of a toothing 2 of workpiece 1, departing from an unknown rotary position of said teeth 4 and tooth slot in between of the workpiece. The tool 11 is, here, centered with respect to workpiece 1 in a tangential direction (up-down direction in FIG. 1C).

The tool 11, being rotatably drivable round its rotation axis B10, but also rotatable in a torque-free tracking mode has, in this exemplary embodiment, two teeth which are azimuthally equally spaced from one another. However, also tools with more teeth are possible, for instance three, four, five, or even six teeth. In the present case, the teeth are formed by arms 14 and cutting blades 12, which are mounted on the arms 14 extending essentially radially from the rotation axis B10 of the tool. As mentioned above, monitoring can be done also via the standstill torque or current in the position control mode.

Figure 1A:
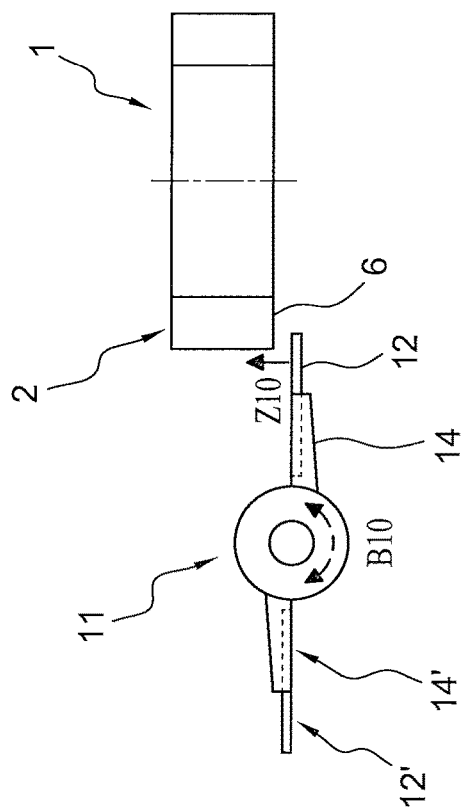

Firstly, a pre-positioning of tool 11 into the relative position to workpiece 1 shown in FIGS. 1A and 1B is performed, in which an arm 14 is directed in direction radial versus and onto the rotary axis C10 of the workpiece, but the arm 14 being still axially (Z10) outside an envelope of the workpiece 1 representing the volume thereof generated by rotation of the workpiece 1 around its axis of rotation. In the present embodiment, an arm 14 extends in a radial axis X10 orthogonal to the axis of rotation C10 of the workpiece, the tool 11 could, however, with respect to the position shown in FIG. 1A, be somewhat rotated in clockwise direction, as long as an axial movement parallel to the axis C10 of the workpiece would lead to a collision of the envelope while a further tooth 12', 14' of tool 11, following in arm 14 in counter clockwise direction, does not yet enter the envelope of the workpiece 1. Axially seen, there is an interval between the blade 12 directed versus the workpiece and the facing end face 6 of the workpiece 1, in the present example of for instance 5 mm. Larger intervals are possible, but increase the time for the subsequently described movements. Also, shorter intervals are possible.

In the case of a spur gear workpiece, the rotation axis B10 of the tool, here a fly cutter, may be positioned in a plane orthogonal to the axis of rotation C10 of the workpiece. Alternatively, in the case of a helical gear, the tool may be positioned by pivoting the tool such that the arrangement of the teeth of the tool 11 follow the helical toothing, as shown in FIG. 1B (setting a pivot angle A10 tangentially to the helix angle).

Departing from this pre-positioning, an axial relative approaching movement between tool 11 and workpiece 1 is executed, for instance by means of a linear axis Z10 being an axis of motion of the tool 11. The workpiece 1 is thereby not rotated in case of a spur gear. In the case of a helical gear a synchronization between the tool and workpiece position is performed, namely the coupling of the axial movement of the tool of linear axis Z10 and additional increment of rotation of rotary C10 of workpiece 1, such that tooth 12 of tool 11, in case that entering during the axial movement Z10 without collision into the tooth slot 5 when reaching the end face 6, the relative position within the tooth slot 5 is kept by continued axial movement (usual synchronization in use of helical gears).

If this event takes place, namely the entry into the tooth slot 5 without collision, the axial collision-free entering is successful at first try, and the tool 11 can be positioned into a pre-defined height with respect to the width direction of the toothing of the workpiece 1, for instance at the center height of the workpiece in width direction.

Figure 1C:
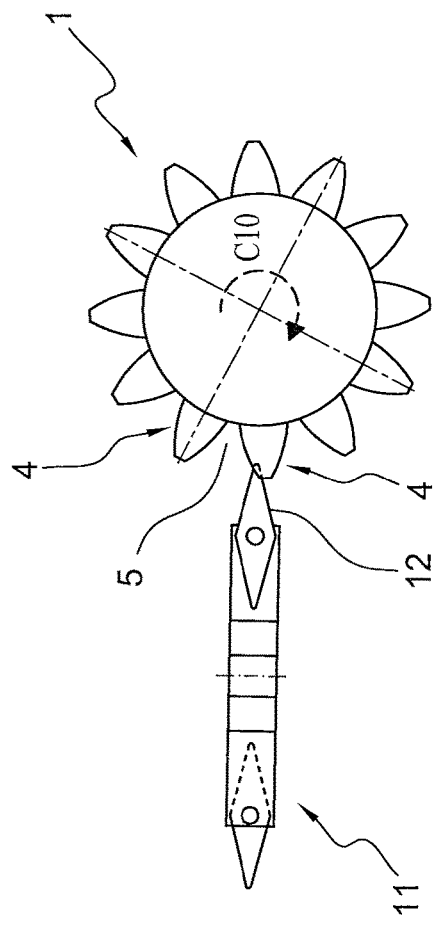

Said situation, however, does not apply in the situation shown in FIG. 1C. Rather, due to the rotary position of workpiece 1 shown in FIG. 1C, a collision of a face of blade 12 of tool 11 with a tooth 4 of workpiece toothing 2 arises.

The tool 11, which before starting the axial movement was set into the torque-free tracking mode (or kept in the position control mode, if surveillance is done via the standstill monitoring), will receive, by contact generation, a traceable torque which can be detected by monitoring surveillance of the rotation axis B10 of the tool. Thereby, it can easily be detected whether a contact was made (and when) or not. The axis under surveillance for the question of contact is, therefore, the rotation axis B10 of the tool 11, which is not a moved axis during the positioning movement leading to the contact making. On the other hand, the movement along the dedicated linear axis Z10 for generating the contact does not need to be monitored/surveilled for detecting said contact. As a consequence, the axial positioning movement might be executed more rapidly, since the movement thereof does not need to be slowed down in view of an approaching contact in order to avoid a violent contact disturbing the time evaluations thereof.

Moreover, the contact is, in this exemplary embodiment, made with a flat side-face of the cutting blade, which itself has no cutting function. Accordingly, there is no danger of damaging the cutting edges of the tool 11/blade 12.

In case that, as shown in FIG. 1C, it comes to a contact between tool 11 and workpiece toothing 2, the positioning step is repeated, however, starting from another rotary starting position of the workpiece 1. To this end, the tool is retracted along the Z10 axis to its starting position and the rotary axis B10 of the tool is back-positioned into its starting position (FIG. 1A). Before starting a second/further positioning movement of the tool 11, workpiece 1 is rotated by an increment deviating from a multiple of the pitch of the workpiece toothing 2, for instance by an increment 0.5 or 0.25, or 0.75 of the pitch. In this way, soon a rotation position of the workpiece 1 will result, in which the tool 11 can axially enter the gear slot 5 contact-free, whereupon the axial entering is concluded and the tracking mode of the rotation axis B10 of tool 11 can be deactivated.

Figure 2B:
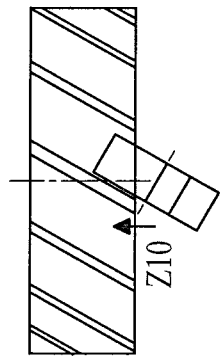
FIGS. 2A, 2B and 2C schematically show a situation where the axial insertion is possible.
Figure 2A:
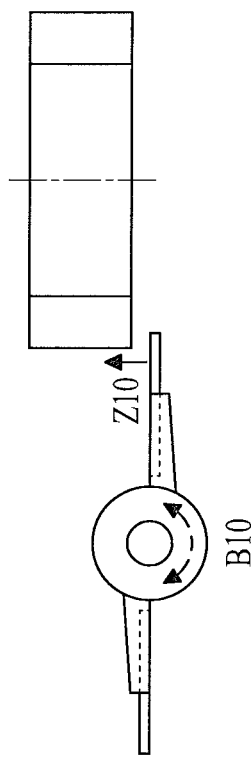
Figure 2C:
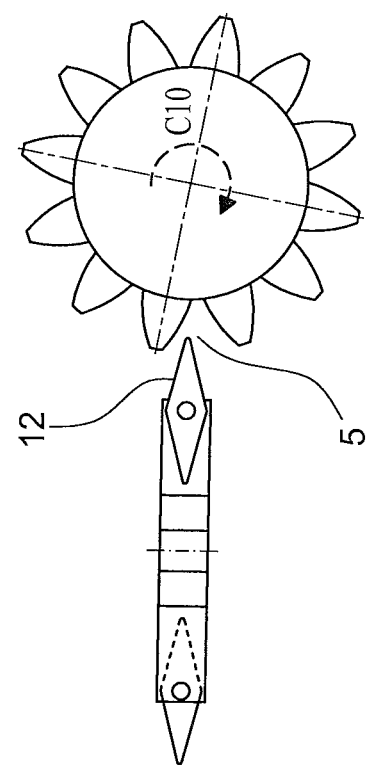

A rotary position, where this situation is achieved, is shown in FIG. 2C, while FIGS. 2A, 2B show the relative positioning between tool 11 and workpiece toothing 2 in the representations corresponding to that of FIG. 1A and FIG. 1B. Thereby, as mentioned above, it is not mandatory that axially the workpiece center is reached, since for the axial entering is only relevant to find a workpiece position in which the tool 11 can, in particular without negative impact onto its cutting-relevant components, find a position in the gear slot 5. The relative position of the blade 12 having entered the gear slot 5 with respect to the overall position of the gear slot 5 and, therefore, the rotary position of the center of the gear slot 5 is then still undetermined.

Before, as explained in more detail below, the rotary position of the tooth slot 5 is then determined with reference to a machine reference, which might be the radial axis X10 going through the rotary axis C10 of the workpiece, the tool 11 can be radially retracted some amount from the radial spacing which was set during the pre-positioning, in a way that tooth/blade 12 is still within the envelope of the workpiece toothing 2. Thereby, a tangential distance to the next gear flank of the next tooth 4 of workpiece 1 is obtained, even if during the axial entering there was casually a quasi-contact state.

Figure 3B:
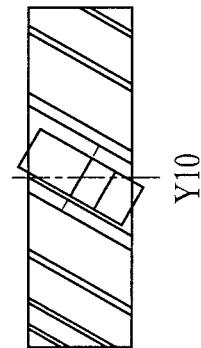
FIGS. 3A, 3B and 3 C schematically show a starting position for tangential displacement of the tool.
Figure 3A:
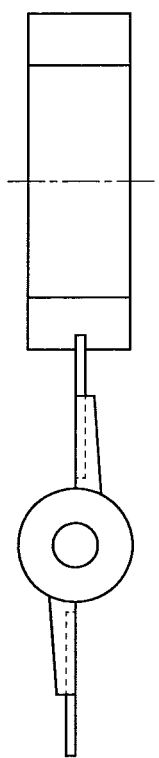

Now, departing from the relative position between tool 11 and workpiece 1 shown in FIGS. 3A, B, C, the determination of the rotary position of the center of a tooth slot 5 is described.

Figure 3C:
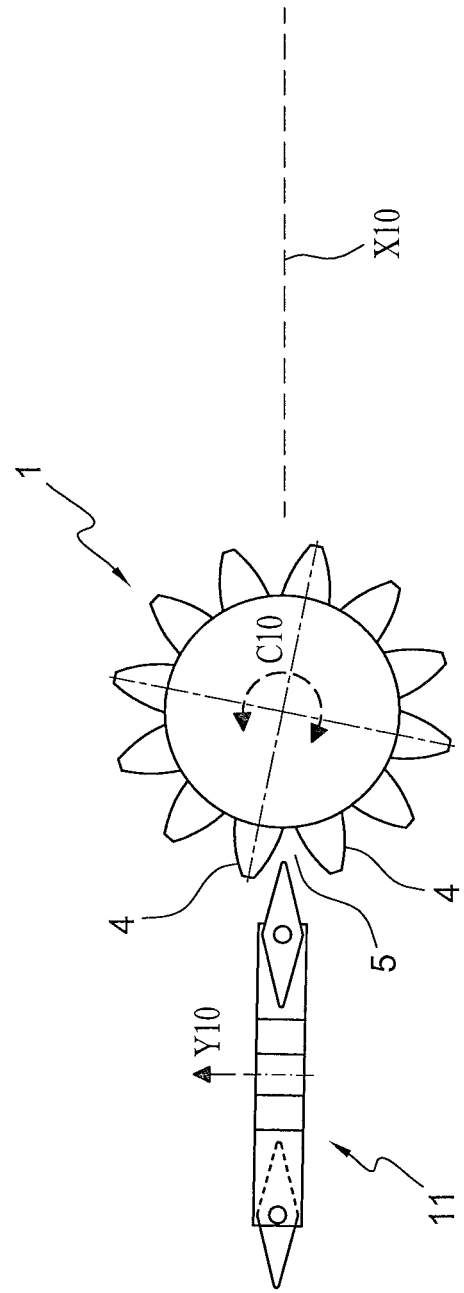

To this end, other axes are moved and monitored for surveillance, such that for the following, reference is made to the representations of FIGS. 3A, 3B and 3C corresponding to the representations of FIGS. 2A, 2B and 2C, but having the blade 12 already entered into the slot 5 within the face width of gear 1 (FIG. 3A).

The rotation axis C10 of workpiece 1 is set into the torque-free tracking mode (or kept in the position control mode if the standstill surveillance mentioned above is used). Thereupon, the tool 11 is tangentially moved (by, in this embodiment, a tangential axis Y10 moving the tool), firstly to for instance the left-flank of tooth 4 surrounding the gear slot 5 into which the tool tooth 12 has been axially positioned. Surveilled for contact is, however, not the axis of movement Y10 for this tangential movement, but the rotation axis C10 of workpiece 1, which is not taking part of the movement leading to the contact. At contact with the left-flank (FIG. 4A), axis positions Y10 and C10 are determined and stored (storing of C10 not mandatory). Subsequently, the right-flank of the other tooth delimiting to slot 5 is approached (FIG. 4B), and again the Y10/C10 values at contact are determined (and stored).

Figure 4A:
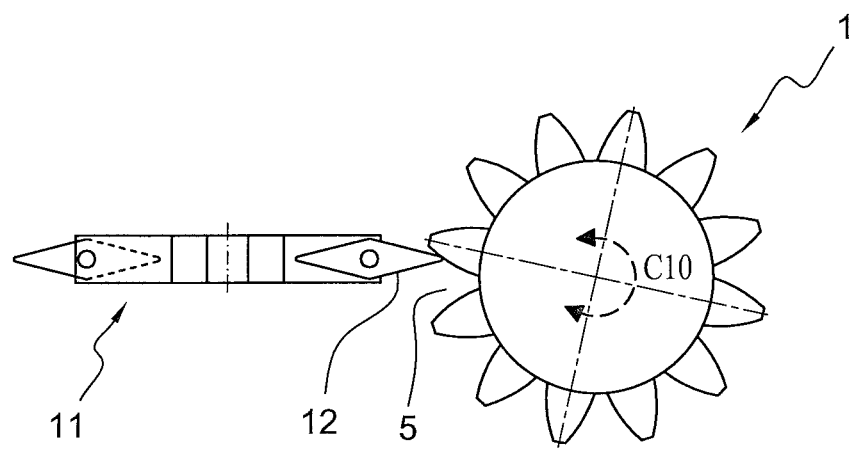
FIGS. 4A and 4B show the contacting positions starting from the situation in FIG. 3C.
Figure 4B:
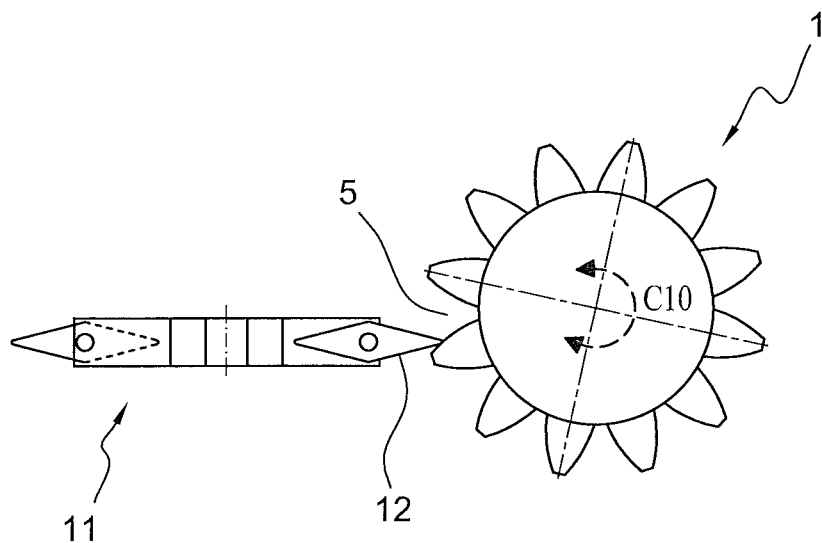

The relative position at contact with left-flank respectively right-flank is shown in FIGS. 4A, 4B. Should the tool tip, after axial insertion (FIG. 2), have already arrived at the center of the tooth slot, there would be the same travelling distance $Y10_L$ (to the left flank) and $Y10_R$ (to the right flank) for the Y10 movement to the left-flank respectively right-flank.

Otherwise, the geometric dimensions of the workpiece being known up to manufacturing inaccuracies, the above-described tangential centering process can be repeated after the workpiece 1 is rotated with tendency to equalize the difference in the travelling path $Y10_L$ and $Y10_R$. Accordingly, in the next iteration step a lower difference between $Y10_L$ and $Y10_R$ is reached, and by rapidly converging iteration this method is continued, until the difference between $Y10_L^{(n)}$ and $Y10_R^{(n)}$ is below a given threshold. The C10 axis position resulting from this iteration is then the position of the tooth slot center with respect to the pre-defined machine reference, being for instance the X10 axis (radial axis through the workpiece axis). Of course, tracking of the C10 (or B10) values can be achieved by rotary encoders of the respective spindles.

For the embodiments discussed with respect to FIGS. 3 and 4, the starting position of the tangential tooth positioning is a rather central position (within a tooth slot around the radial axis X10), and contact is made in the portion of the tip of the cutting edges, that is the rounding of the cutting edge.

Subsequently, a method according to another embodiment is discussed, in which the tangential movement for positioning for flank contact is starting from an off-center position. Now, the region of the tool making contact with the workpiece is no longer the rounding at the tip of the cutting edge, but straight portion 122 of the blade 12.

Figure 5A:
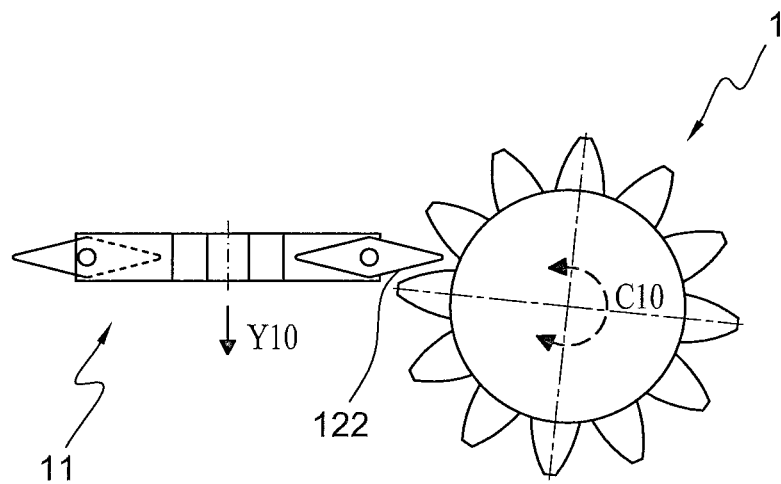
FIGS. 5A and 5B schematically show the establishment of a contact from an off-center position for one flank.
Figure 5B:
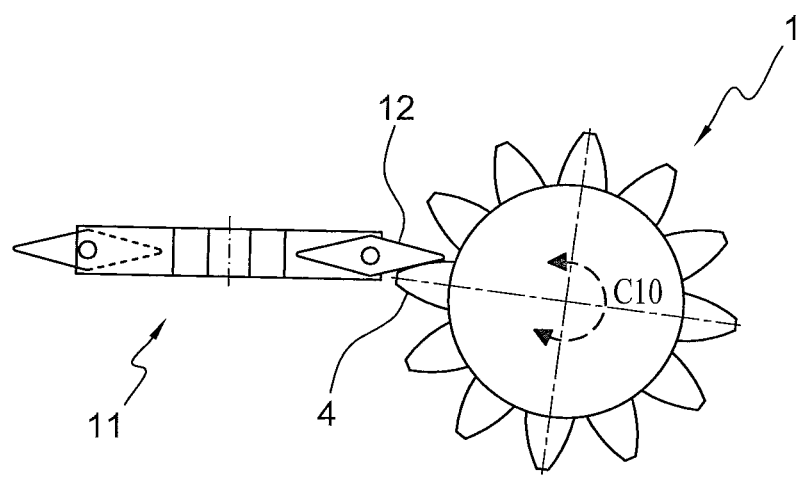

Hereto, FIG. 5A shows a starting position and FIG. 5B the contact position (right flank), reached by movement of the not-surveilled linear axis Y10, while the axis determining contact by surveillance is again the rotation axis C10 of the workpiece 1, held in the torque-free tracking mode (or in the position control mode when the standstill surveillance is performed).

Figure 6A:
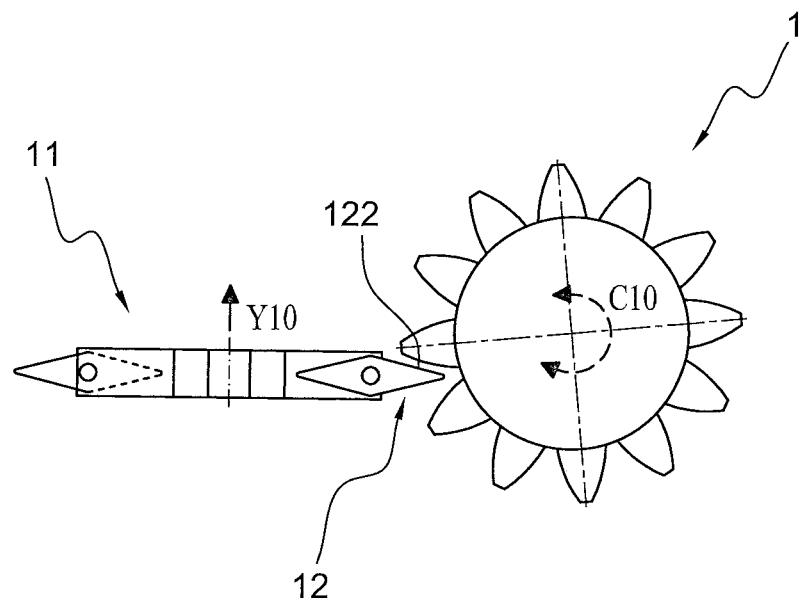
FIGS. 6A and 6B schematically show contact establishment starting from an off-center position for the other flank than that of FIG. 5.
Figure 6B:
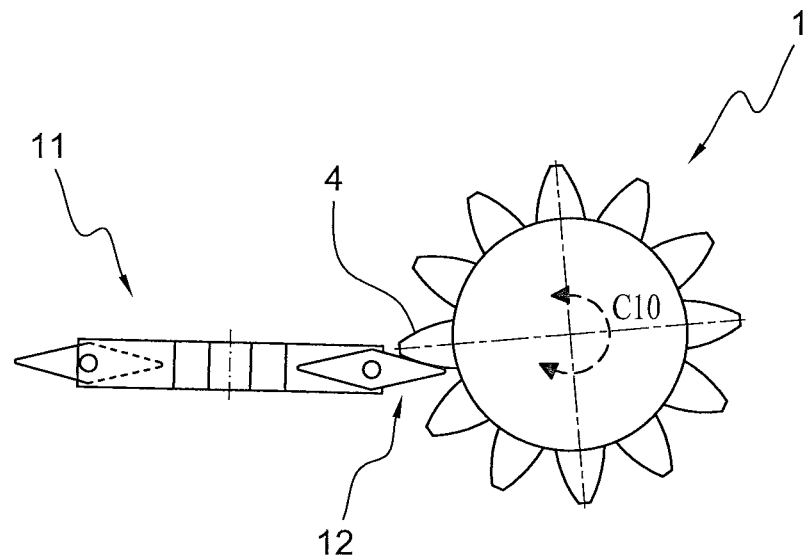

The tangential positioning versus the left-flank is shown in FIGS. 6A and 6B corresponding to the representation of FIGS. 5A and 5B. From comparison between FIGS. 5B and 6B it is recognizable that the contact region in the present embodiment of FIG. 6 is a straight part 122 of the teeth/blade 12 of tool 11. The normal vector at contact is, for a workpiece toothing with involute tooth flanks, the tangent to the base circle of the workpiece toothing 2. Consequently, when having an undesirable deviation from the workpiece profile with respect to the theoretical desired profile (additional stock) when manufacturing the toothing of the workpiece, there is a lower possible error in the determination of the relative positioning between tool and workpiece with respect to the embodiment shown in FIGS. 3 and 4. Moreover, by using the embodiment of FIGS. 5 and 6, details of the roundings of the cutting edges of the tool no longer play any role in the position determination, such that the accuracy of the method is increased. Therefore, apart from determining the rotary position of the tooth slot center of the workpiece with high accuracy, the tooth thickness/gap dimension of the workpiece can also be determined from the obtained data from the surveillance of the contact (Y10/C10 values) with an accuracy which is in the range of the accuracy of measuring stations specifically designed to this aim, although no separate measuring station is required and the chamfering tool 11 itself gives, by the above contact method, the necessary information.

In this way, as is described below in more detail, for instance a first workpiece of a workpiece series may be checked not only with respect to its rotary position. Moreover, in the clamping position of workpiece 1 provided for the machining of workpiece 1 with tool 11, a check of the workpiece toothing 2 with regard to the working quality of the generation of the workpiece toothing 2 can be performed via measurements of, for instance, the tooth thickness.

The measuring steps by means of a straight/tangent portion of tool 11 described above is subsequently discussed referencing the single steps.

First, a positioning Y10/C10 to starting position for measuring for instance the right-flank is effected. Subsequently, the rotation axis C10 of workpiece 1 is set in the torque-free tracking mode or kept in the position control mode (standstill surveillance). By a movement with dedicated linear axis Y10 of tool 11 for example, contact is made with the right-flank by tangential movement of tool 11. By surveilling the rotation axis C10 of workpiece 1 held in tracking mode (in this case, negative rotation of the axis) the contact is surveilled and the Y10/C10 values are determined. After the contact, the remaining programmed path of the movement axis Y10 can be disregarded and the positioning Y10/C10 is set to the starting position for measuring the left-flank (change in the representation of FIG. 5 to FIG. 6). Subsequently, the Z10 axis is again set in the torque-free tracking mode or kept in the position control mode (standstill surveillance) and the tangential contact positioning of the left-flank is done with the tool 11. The determination of the positive axis rotation of the surveilled axis C10 and the storage of the respective Y10/C10 values follows together with the disregarding of the remaining programmed path of linear axis Y10. Thereby, not only the center of the tooth slot 5 can be determined (centering operation), but also the tooth width can be calculated. This is because from the results obtained by contact measuring and the known relationship between the contact point over the contact normal and the base circle of the workpiece (see also FIG. 7), and the workpiece parameters defined for the gear manufacturing process, all necessary parameters for calculating the tooth thickness are given. Further, other characteristics can be measured/checked.

In this way, one can determine for the first workpiece of a workpiece series, whether or not the tooth width corresponds to the desired theoretical characteristics when manufacturing the workpiece toothing 2. A corresponding feedback-signal can be given to the control of the gear machine generating the workpiece toothing 2, for instance a power-skiving machine or a hobbing machine or any other gear generating machines, whereupon said machine may adapt the generation process accordingly to correct the stock deviation.

If the tool is used for measuring as mentioned before, it is preferred to include the X10 axis into the positioning such as to have a positioning contacting movement in the transverse plane normal to the workpiece flank profile (for example, an involute). The contact point at the tool is then independent of the stock, and accurate measurements can not only be done for tooth thickness, pitch and concentricity, but also for profile configuration and flank line configuration.

Figure 7:
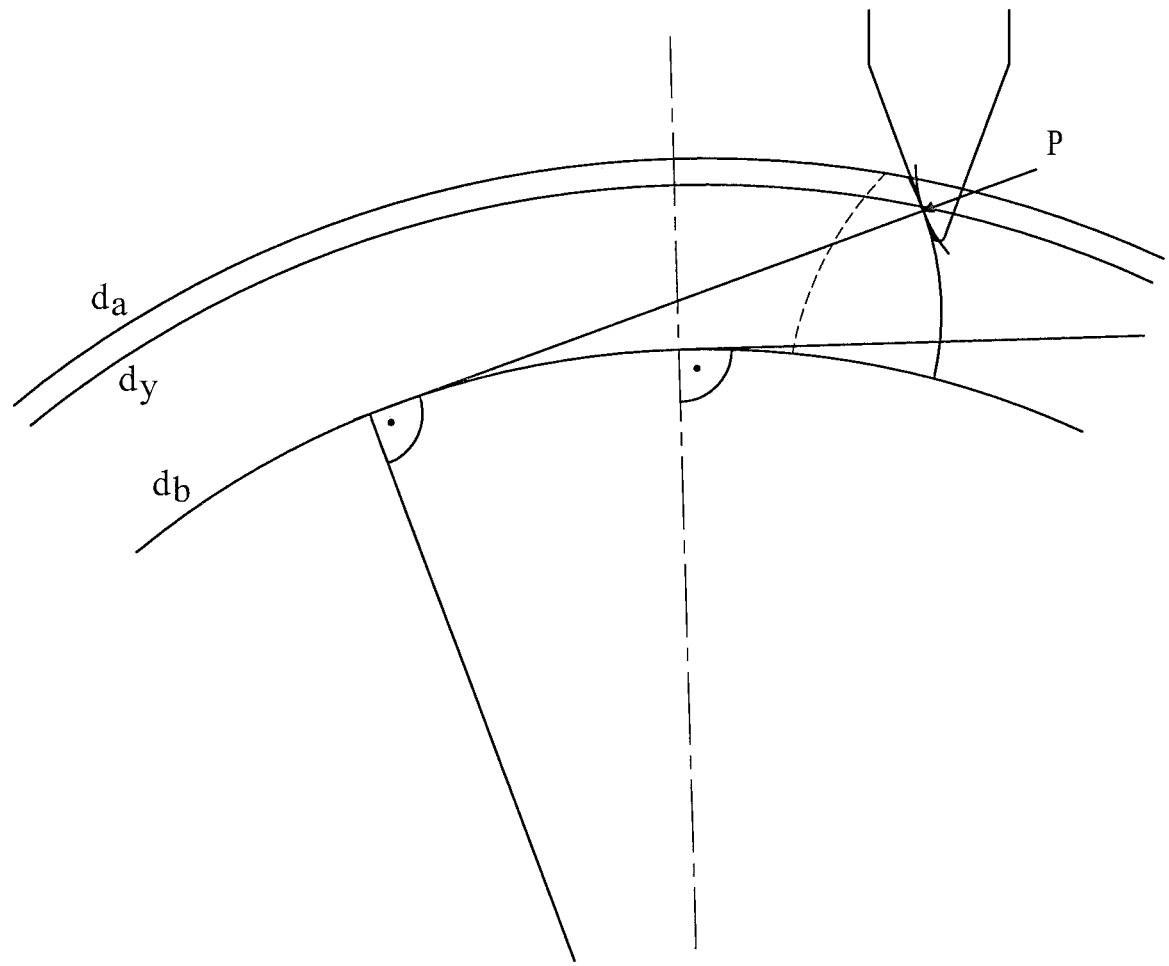
FIG. 7 shows again contact situation, here with base circle.

In FIG. 7, the contact is shown again for a contacting movement normal (orthogonal) to the tooth flank profile in the transverse plane. The circle at the contact point P shows that other than the displayed straight contact face of the tool, curved faces are possible. At reference $d_b$ the base circle is seen, at $d_y$ the circle including P and at $d_a$ the outer diameter circle. In particular for helical gears, straight edges of the tool are preferred, allowing the re-positioning of the edge into one and the same transverse plane by rotation of the tool, after the edge got out of such a plane due to the tool pivot (FIG. 1B). The desired height of contact in workpiece axis direction (Z10) can be established by including a respective axis movement parallel to Z10.

In case that the workpiece undergoing the centering and measuring operation as discussed above is already of sufficient quality, the working of the workpiece toothing 2 by tool 11 can be executed, in the current example an operation to cut a chamfer in the edges of the teeth 4 of the workpiece. The chamfering operation itself can be performed according to the basic knowledge of the person skilled in the art, as he is used for chamfering with, for example, fly cutter systems.

The tool 11 is not limited to the form shown in the figures, having cutting blades mounted on a body. For example, tool 11 could be uniformly manufactured from a tool steel, powder metal, metal-ceramic or carbide material.

While the invention has been described with reference to preferred embodiments and examples, it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of preparing a machining process of a toothed workpiece (1) rotatably drivable around its rotation axis (10), the machining process to be executed by a chamfering tool (11) rotatably drivable around its rotation axis (B10), wherein, for establishing a synchronized matching engagement of said chamfering tool with the workpiece toothing (2), a contact with the workpiece (1) can be or is generated by performing a movement via a first positioning axis (Z10) or a second positioning axis (Y10), and, by means of a surveillance of a movement dedicated to an axis of motion (B10; C10), a contact to the workpiece (1) is used for establishing information about a relative rotary position of the workpiece,
characterized in that the contact is made by a portion (12) of said chamfering tool (11) and the dedicated axis of motion (B10; C10) is an axis capable to move or rotate the workpiece or said chamfering tool but which is not the positioning axis (Z10; Y10).

2. The method according to claim 1 comprising said first positioning axis (Z10) moving said chamfering tool with a main direction component in direction of the rotation axis (C10) of the workpiece, the first axis being in particular parallel to the rotation axis of the workpiece.

3. The method according to claim 2 wherein the dedicated axis (B10) of motion is the rotation axis of said chamfering tool.

4. The method according to claim 2 wherein in case of the contact generation a positioning by means of the first axis (Z10) is repeated after an execution of a rotation increment of the workpiece, until no contact is generated.

5. The method according to claim 2 wherein said chamfering tool (11) is star-shaped and prior to the positioning movement a pre-positioning is effected for a radial (X10) overlap of one of the teeth (14, 12) of said chamfering tool with the envelope of the workpiece toothing.

6. The method according to claim 1 wherein, at said contact generation, the contacting portion of said chamfering tool is a portion other than the portion of said chamfering tool provided for a cutting function of said chamfering tool.

7. The method according to claim 1 comprising said second positioning axis (Y10) moving said chamfering tool with main direction component tangential to the rotation axis of the workpiece, said second axis being orthogonal to a plane spanned by a radial positioning axis (X10) and the rotation axis (C10) of the workpiece.

8. The method according to claim 7, wherein the workpiece rotation axis (C10) is the dedicated axis of motion for the positioning of the second axis.

9. The method according to claim 7 wherein contact is made with a left-flank and a right-flank of toothed flanks of the workpiece toothing (2).

10. The method according to claim 9 wherein the one-after-another flank contact generation is iteratively repeated with intermediate rotary position correction of the workpiece, until the positioning movements to the left respectively the right-flank are of equal length.

11. The method according to claim 1 wherein additionally to the determination of the rotary position of the workpiece, a contact-less sensor capable of detecting the rotary position of the tooth slot center of the workpiece toothing is provided which measures said position and the measurement is stored as a centering reference, such that centering operations of subsequent equal workpieces can be performed with the sensor without need of said chamfering tool.

12. A method of performing a machining process of a toothed workpiece (1) rotatably drivable around its rotation axis (C10), to be executed by said chamfering tool (11) rotatably drivable around its rotation axis (B10) according to claim 1 for chamfering the edges of the workpiece toothing, and wherein a measurement on the workpiece toothing (2) is performed by use of said chamfering tool (11) and in the same workpiece clamping as that used for the gear working.

13. The method according to claim 12 wherein said measurement performed by said chamfering tool includes determining the rotary position of the workpiece toothing.

14. The method according to claim 13 wherein on the tooth side the contact is made with a portion (122) of said chamfering tool being straight or having low curvature.

15. The method according to claim 14 wherein before contact said portion (122) is, by said chamfering tool rotation, brought in a transverse plane of the workpiece in case of said chamfering tool being pivoted with respect to the workpiece.

16. The method according to claim 12 wherein said measurement performed by said chamfering tool determines the tooth thickness of the workpiece toothing (2).

17. The method according to claim 16 wherein a left-flank of a first tooth of the workpiece is subject to the contact, whereas a right-flank of a second tooth being subject to the contact, the first tooth being distant from the second tooth by having at least half of a pitch in between their rotary positions during respective contact.

18. Control software for a gear machine causing the machine to execute a method according to claim 1 when executed on a control of the machine.

19. Chamfering station for chamfering toothed workpieces, including a control configured to control the station to perform a preparatory method according to claim 1.

20. Gear machine with a chamfering station according to claim 19.

* * * * *